United States Patent [19]

Bucher

[11] Patent Number: 4,765,453
[45] Date of Patent: Aug. 23, 1988

[54] PELLET-PRESS-TO-SINTERING-BOAT NUCLEAR FUEL PELLET LOADING SYSTEM

[75] Inventor: George D. Bucher, McCandless Township, Allegheny County, Pa.

[73] Assignee: Westinghouse Electric Corp., Pittsburgh, Pa.

[21] Appl. No.: 43,059

[22] Filed: Apr. 27, 1987

[51] Int. Cl.[4] .............................. B65G 47/26
[52] U.S. Cl. .................... 198/431; 198/534; 198/533; 198/608; 198/803.16; 53/534; 53/247; 53/248
[58] Field of Search ............... 193/3, 12, 32; 198/533, 198/534, 431, 392, 608, 803.16; 53/247, 248, 251, 260, 534; 414/151; 425/315, 361, 422

[56] References Cited

U.S. PATENT DOCUMENTS

| | | | |
|---|---|---|---|
| 1,375,988 | 4/1921 | Walker | 193/32 |
| 1,932,683 | 10/1933 | Beeson | 198/803.16 X |
| 2,290,456 | 7/1942 | Stilwell | 198/534 X |
| 2,371,783 | 3/1945 | Sneed et al. | 198/534 X |
| 2,670,187 | 2/1954 | Goodrich . | |
| 2,822,078 | 2/1958 | Haven | 198/803.16 X |
| 3,372,790 | 3/1968 | Pembroke et al. . | |
| 3,488,804 | 1/1970 | Butcher | 425/361 X |
| 3,658,207 | 4/1972 | Schultz . | |
| 4,332,120 | 6/1982 | Haynes et al. . | |
| 4,365,445 | 12/1982 | Watson . | |
| 4,519,524 | 5/1985 | Hirose . | |
| 4,566,835 | 1/1986 | Raymond . | |
| 4,573,847 | 3/1986 | Howell et al. . | |

FOREIGN PATENT DOCUMENTS

| | | | |
|---|---|---|---|
| 530274 | 7/1955 | Italy | 198/533 |
| 2038766 | 7/1980 | United Kingdom | 53/247 |

Primary Examiner—Robert J. Spar
Assistant Examiner—D. Glenn Dayoan

[57] ABSTRACT

A system for loading friable nuclear fuel pellets into sintering boats from a pellet press which ejects newly made pellets. A chute receives the ejected pellets and discharges them into an upright bowl at a location towards the top of the bowl near its inner surface with a tangential horizontal component of velocity. The bowl, which has an open smaller diameter bottom, is rotated such that the bowl near the pellet-discharge location has a velocity which generally matches the magnitude and direction of the horizontal component of the velocity of the pellets at the discharge location. A conveyor moves a line of adjacently positioned boats horizontally beneath the bottom of the bowl. A flexible strap which cushions the pellets as they enter a sintering boat also acts as a seal between boats.

10 Claims, 4 Drawing Sheets

PELLET-PRESS-TO-SINTERING-BOAT NUCLEAR FUEL PELLET LOADING SYSTEM

CROSS REFERENCE TO RELATED APPLICATIONS

Reference is hereby made to the following copending application dealing with related subject matter and assigned to the assignee of the present invention.

1. "Apparatus For Unloading Nuclear Fuel Pellets From A Sintering Boat" by George D. Bucher et al., assigned U.S. Ser. No. 637,371 and filed Aug. 3, 1984, now U.S. Pat. No. 4,642,016.

BACKGROUND OF THE INVENTION

1. Field of the Invention

The present invention relates generally to handling nuclear fuel pellets and, more particularly, is concerned with a system for loaidng newly made (green) friable nuclear fuel pellets into sintering boats from a pellet press.

2. Description of the Prior Art

An operational step in the nuclear fuel fabrication process is the loading of friable nuclear fuel pellets, which have been ejected from the die table surface of a pellet press, into sintering boats (containers) in preparation for high temperature firing of the pellets in a sintering furnace. This operation requires careful handling of the pellets, because the pre-sintered pellets are easily crumbled.

Typical nucelar fuel pellet loading devices are disclosed in U.S. Pat. Nos. 4,332,120 and 4,566,835. The loader described in U.S. Pat. No. 4,332,120 emnploys a vertical chute which has a set of zig-zag inclined plates to guide the pellets into a boat which rests on a spring-biased platform. The loader described in U.S. Pat. No. 4,566,835 employs a horizontally disposed drum which receives a line of pellets into a vertically aligned lengthwise channel and which discharges the line of pellets into a boat when the drum rotates the channel to a below horizontal position.

What is needed is a more rapid sintering boat pellet loader, one which operates without stopping to change sintering boats and which transfers ejected pellets without stopping to first collect a line of pellets.

SUMMARY OF THE INVENTION

It is an object of the invention to provide a soft handling system for rapidly loading nuclear fuel pellets into a sintering boat from a pellet press.

It is an other object of the invention to provide a soft handling system for continuously loading nuclear fuel pellets into a plurality of sintering boats from a pellet press.

Additional objects, advantages and novel features of the invention will be set forth in part in the dscription which follows, and in part will become apparent to those skilled in the art upon examination of the following or may be learned by practice of the invention. The ofjects and advantages of the invention may be realized and attained by means of the instrumentalities and combinations particularly pointed out in the appended claims.

To achieve the foregoing and other objects and in accordance with the purpose of the present invention as embodied and broadly described herein, the system, for loading nuclear fuel pellets into a sintering boat from a pellet press which ejects newly made pellets from the pellet press die table surface, includes a bowl having a larger open top than open bottom, equipment for rotatably supporting the bowl in an upright position, apparatus for receiving the pellets from the press and for discharging the pellets into the bowl at a location towards the top of the bowl near its inner surface with a tangential horizontal component of velocity, a device for rotating the bowl such that the bowl near the pellet-discharge location has a velocity which generally matches the magnitude and direction of the horizontal component of the velocity of the poellets at the discharge location, and a mechanism for moving a sintering boat horizontally under the bottom of the bowl.

In a preferred embodiment of the invention, the boat moving mechanism includes a transport arrangement for moving a number of adjacently positioned boats horizontally under the bottom of the bowl.

In an exemplary embodiment of the invention, the system also includes a flexible strap having a stationary end positioned upstream of and outside the bowl above its bottom and having a free end positioned in one of the boats when its is under the bottom of the bowl.

Several benefits and advantages are derived from the invention. The rotating bowl and strap features together provide immediate pellet transfer without damaging the pellets during handling. The boat transport arrangement and strap features together provide continuous loading of sintering boats while providing sealing between boats.

DESCRIPTION OF THE DRAWINGS

The invention will become more readily apparent from the following description of preferred embodiments thereof shown, by way of example only, in the accompanying drawings, wherein.

DESCRIPTION OF THE PREFERRED EMBODIMENTS

Figure 1:
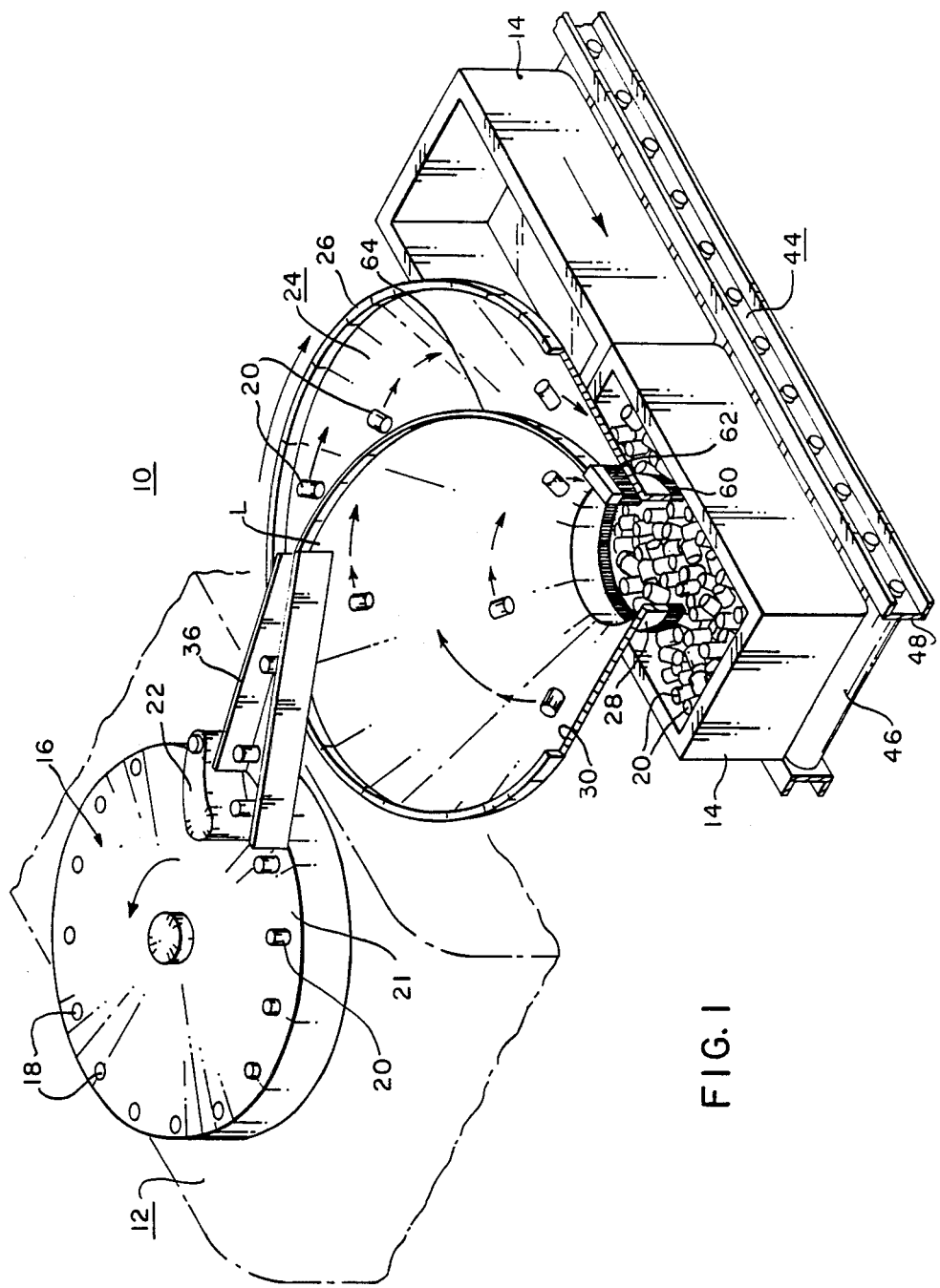
FIG. 1 is an isometric view of the pellet-press-to-sintering-coat nuclear fuel pellet loading system which, for clarity, omits the strap feature and bowl support/rotation apparatus and shows only a portion ofthe pellet press and boat conveyor.

Reference will now be made in detail to several present preferred embodiments of the invention, some examples of which are illustrated in the accompanying drawings. In the drawings, like reference characters designate like or corresponding parts throughout the several views.

Nuclear fuel pellets typically have a right circular cylindrical shape, a length of about 0.7 to 2.1 centimeters, and a diameter of about 0.6 to 1.3 centimeters. They usually are made from uranium dioxide powder which has been pressed into pellet form by a commercially available pellet press. The press normally has a rotating die table containing bores into which the powder is placed. Top and bottom punches compact the powder in the bore to fabricate the pellet. The top punch is withdrawn, and the bottom punch is raised to present a newly made pellet flush with the die table surface. The pellet is ejected from the die table surface when it encouters a stationary pellet-exiting shoe, which is part of the pellet press.

Newly made pellets (sometimes called "green" pellets) are easily crumbled and therefor susceptible to damage during pellet handling, such as when they are loaded into sintering boats. The boats are containers which carry the pellets to a furnace for a pellet sintering operation. The pellets eventually are sealed in fuel rods which are grouped into fuel assemblies which are loaded into the core of a nuclear reactor. A liquid moderator/coolant, such as water, is pumped through the core of the reactor and directed to pass along the fuel rods of the fuel assembly in order to extract heat generated therein by the fuel pellets for the production of useful work, such as the genertion of electrical power.

Figure 2:
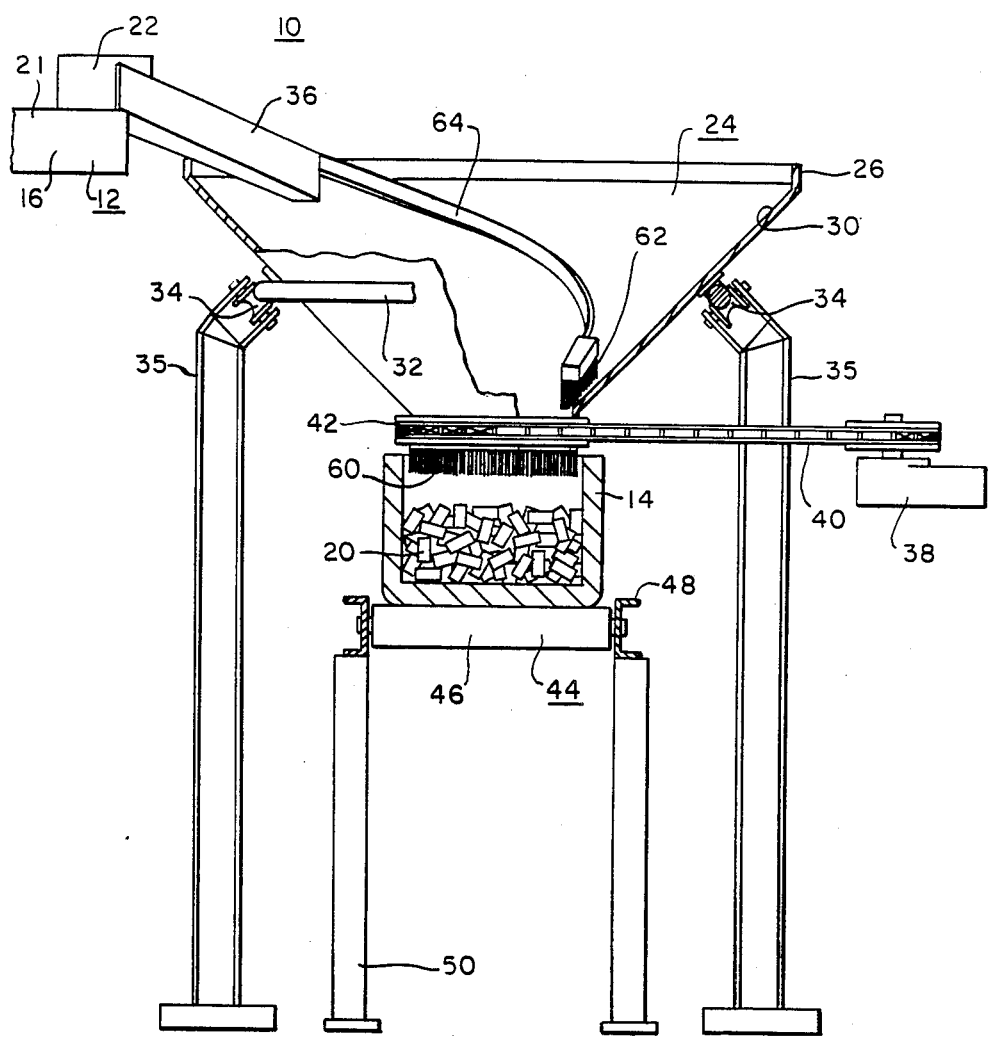
FIG. 2 is an elevational end view of the sintering boat loader of FIG. 1, additionally showing the bowl support/rotation apparatus.
Figure 3:
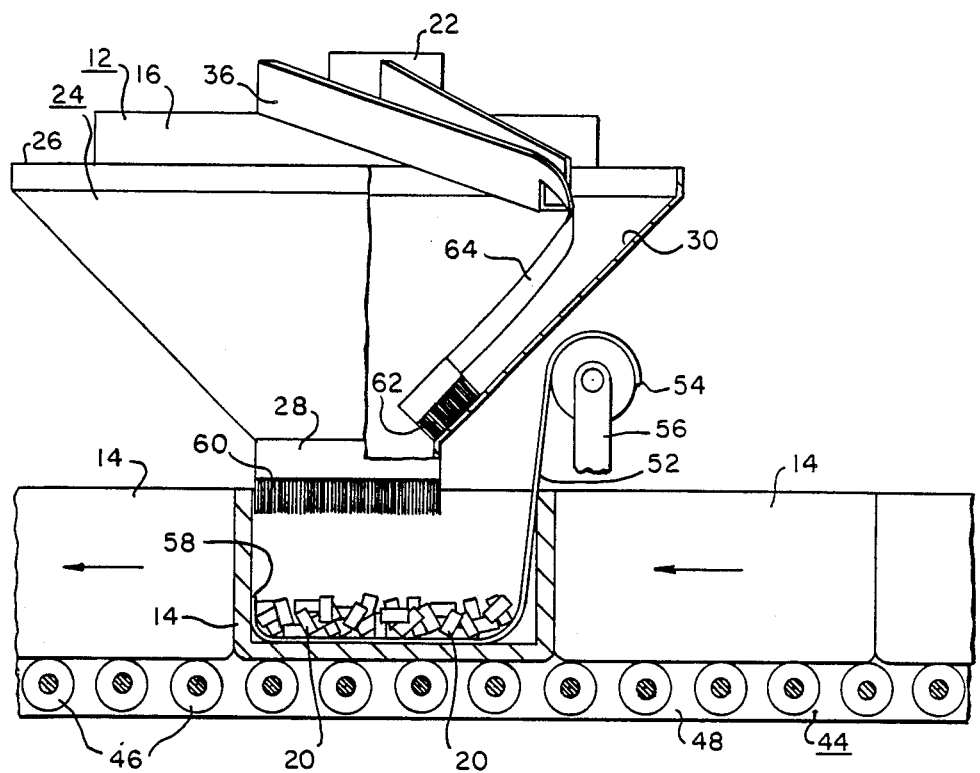
FIG. 3 is an elevational side view of the sintering boat loader of FIG. 1; additionally showing the strap features.

Returning to the pellet-press-to-sintering-boat portion of the fuel fabrication process, the nuclear fuel pellet loading system 10 of the invention, along with a portion of the pellet press 12 and several sintering boats 14, is shown in FIGS. 1 through 3. A typical pellet press die table 16 is 45.7 centimeters in diameter, has sixteen pellet-forming stations (or bores) 18, and rotates at seventeen revolutions per minute. Therefor, the newly made pellets 20 are ejected from the surface 21 of the die table 16 by the stationary pellet-exiting shoe 22 at a rate of 272 pellets per minute.

The pellet loading system 10 inludes a bowl 24 having a longitudinal axis. The bowl 24 also has an open, generally circular top 26 and an open, generally circular bottom 28 with the diameter of the top 26 being greater than that of the bottom 28. An exemplary bowl 24 is made of stainless steel with a 60-centimeter-diameter top 26, a 15-centimeter-diameter bottom 28, and a 45-degree-sloping inner surface 30. The diameter of the bottom 28 should be less than the width of a sintering boat 14 so that all pellets entering the bowl will enter a sintering boat placed beneath the bowl.

The invention includes means for supporting the bowl 24 in a generally upright position such that the bowl is rotatable about its longitudinal axis. An exemplary embodiment of the bowl support means, as seen in FIG. 2, includes a bowl support ring 32 affixed to the outside of the bowl 24, above its center of gravity, to rotatably support the bowl on three or more free-spinning, forty-five-degree-inclined rollers 34 which are held in place by posts 35. Ideally, the bowl 24 is supported at a site such that the top 26 of the bowl 24 is disposed to the side of and below the surface 21 of the pellet press due table 16, as seen in FIG. 2. Other support means include a support plate having a ball bearing arrangement, three or more free-turning horizontal wheels whose rims engage a circumferential groove in the bowl's outer surface above its center of gravity, and the like, as is known to those skilled in the art.

Means are provided for receiving the ejected pellets 20 proximate the surface 21 of the pellet press due table 16 and for discharging the received pellets into the bowl 24 at a location L proximate the inner surface 30 towards the top 36 of the bowl 24 with a pellet velocity having a horizontal component which is generally tangent to the inner surface 30 of the bowl 24 proximate the pellet-discharge location L. Preferably, such means include a pellet chute 36, attached to the pellet press 12, having its pellet-receiving end placed near the surface 21 of the pellet press die table 16 at the pellet-exiting shoe 22 and having its pellet-discharge and (pellet exit) spaced apart from the inner surface 30 of the bowl 24 and placed at the pellet-discharge location L. Other such means include a belt conveyor (with sides) similarly positioned as the chute 36, a pellet transfer tube with a tapering pellet-discharge end, and the like, as is known to those skilled in the art.

Means are furnished for rotating the bowl 24 about its longitudinal axis such that the bowl proximate the pellet-discharge location L has a velocity generally equal in magnitude and direction to the horizontal component of the pellet velocity at the pellet-discharge location L. Exemplary means (seen in FIG. 2) include a variable speed motor 38 which turns the bowl 24 by acting on a drive chain 40 which also engages a sprocket 42 mounted on the outside of the bowl 24 below the support ring 32. Other bowl rotation means include a motor with a drive gear directly engaging teeth fixed to the outside of the bowl, a motor acting through a pulley belt to turn the bowl, a motor to turn one of the previously mentioned bowl supporting free-spinning rollers or free-turning wheels, and the like, as is known to those skilled in the art. It is noted that centrifugal effects and bowl configuration combine to allow the fuel pellets 20 to reduce speed and settle gently toward the bottom 28 of the bowl 24.

Means are supplied for moving the sintering boat 14 generally horizontally beneath and proximate the bottom 28 of the bowl 24. Preferred boat moving means include means for transporting a plurality of linearly aligned and adjacently disposed sintering boats 14 generally horizontally beneath, proximate, and along a direction of motion lineraly across, the bottom 28 of the bowl 24. Exemplary boat transporting means, which allow loading of nuclear fuel pellets 20 into a plurality of sintering boats 14, include a linear moving conveyor 44. With this arrangement, it is not necessary to stop the pellet press 12 to remove a loaded sintering boat before beginning to load pellets into an empty sintering boat. The conveyor 44 includes powered rollers 46 held between side rails 48 (see FIG. 1) vertically positioned on supports 50 (see Figure 2). Other boat moving and/or transportng means include a merry-go-round arrangement, a ferris-wheel arrangement, one or more robot arms, and the like, for presenting one or more sintering boats 14 under the bowl 24 for pellet loadings, as is known to those skilled in the art.

Figure 4A:
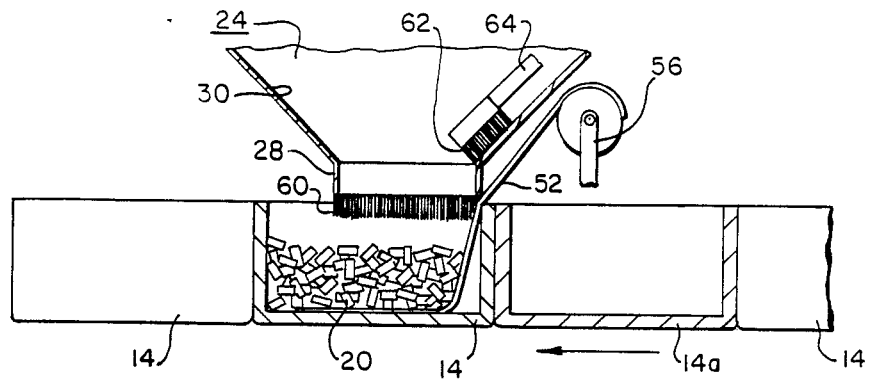
FIGS. 4A, 4B, and 4C are enlarged views of the bottom portion of FIG. 3, at progressive stages in time, showing the pellet-cushioning and inter-boat-sealing functions of the strap as the strap interacts with a sintering boat which passes beneath the bottom of the bowl.
Figure 4B:
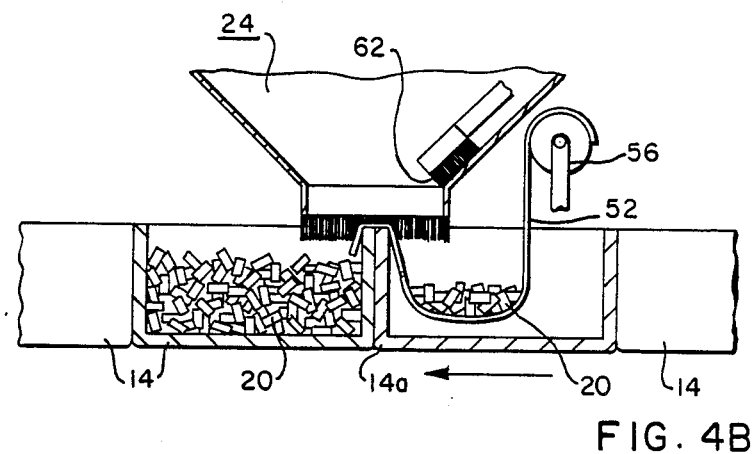
Figure 4C:
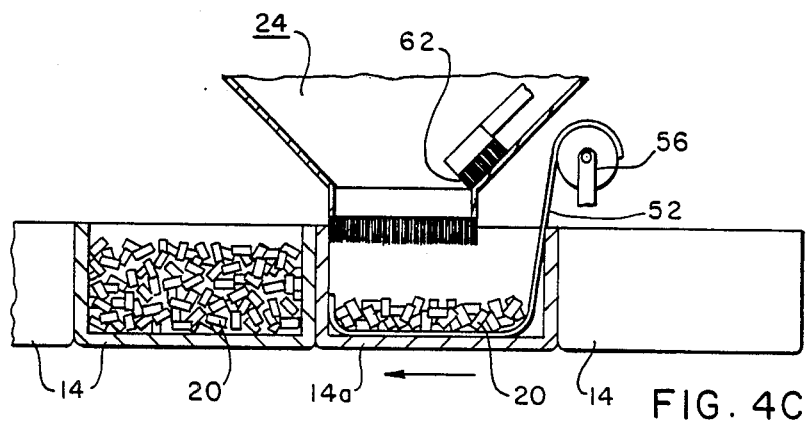

A flexible strap 52, as seen in FIG. 3, is employed to reduce the impact of the pellets 20 when they enter the sintering boat 14 after leaving the bowl 24 and to create a seal between boats as a loaded boat leaves and an empty boat enters the pellet loading area. The strap 52, which may be made of rubber, has a stationary end 54 placed outside the bowl 24 at a position which is vertically above the bottom 28 of the bowl 4 and which is horizontally upstream from the bottom of the bowl generally along the direction of motion of the sintering boats 14. Preferably, the strap's stationary end 54 is held in position by support pillars 56 mounted to the side rails 48 of the conveyor 44. The strap 52 also has a free end 58 which, through the interaction of a sintering boat 14 being conveyed beneath the bottom 28 of the bowl 24, is disposed in the sintering boat when the boat is beneath the bottom of the bowl. FIGS. 4A through 4C show the pellet cushioning and inter-boat sealing operations of the strap 52 as a particular boat 14a, in a line of abutting boats 14, is brought into pellet loading position beneath the bottom 28 of the bowl 24, as caan be appreciated by those skilled in the art. The strap 52 also keeps any pellet fines (dust) from getting between the boats 14.

To help guide the pellets 20 (and any pellet dust) from the bottom 28 of the bowl 24 into the sintering boat 14, the pellet loading system 10 utilizes a flexible pellet-containment ring 60 which is concentric with, attached to, and depends from the bowl's bottom 24. The ring 60, which may be a circular brush, extends into a sintering boat 14 when the boat is beneath the bowl's bottom 28.

A stationary pellet sweep 62 is provided to control the position where most, if not generally all, the pellets 20 will exit the bottom 28 of the bowl 24. The sweep 62, which may be a flexible brush, is disposed inside the bowl 24, adjacent the bowl's inner surface 30, and proximate the bowl's bottom 28. Preferably, the sweep 62 also is placed at the horizontal position which is upstream fromt hecenter of the bottom 28 of the blow 24 generally along the direction of motion of the sintering boats 14, as shown in FIGS. 4A through 4B. So positioned, the sweep 62 works to drop most, if not all, of the pellets 20 out of the bowl 24 at a time when they are over the pellet cushioning strap 52 (see FIGS. 4A through 4C, and especially 4B). In an exemplary design, shown in FIG. 3, the sweep 62 is attached to the lower end of an arm 64 whose upper end is attached to the pellet chute 36, It is noted that the arm 64, over the lower majority of its length, is spaced apart from the bowl's inner surface 30 by a distance greater than the diameter of the pellets 20, as as not to interfere with the motion of the pellets 20 as they descend to the bottom 28 of the bowl 24.

The above-described elements of the pellet loading system 10 work together to provide a gentle, controlled transfer of fragile, as pressed, nuclear fuel pellets 20 from the press die table 16 to moving or stationary sintering boats 14. It is clear that the operating paramemter, such as conveyor speed, bowl rotation speed, and the like, as well as the dimensions of the elements, such as the length and slope of the pellet chute 36, are to be chosen to best meet the demands of the particular pellet press, pellet size, etc., as is within the purview of those skilled in the art.

In the specification set forth above, it is understood that a generally equal magnitude is defined to be equal within plus or minus twenty-five per cent, and that a generally upright position, motion along a direction, or a generally equal, tangent, or horizontal direction is defined to be such within plus or minus fifteen degrees.

It will be apparent that many modificatons and variations are possible in light of the above teachings. It, therefore, is to be understood that within the scope of the appended claims, the invention may be practiced other than as specifically described.

I claim:

1. A system for loading nuclear fuel pellets into a sintering boat from a pellet press which ejects newly made said pellets from a pellet press die table surface, said system comprising:
   (a) a bowl having an inner surface, a longitudinal axis, an open and generally circular top of larger diameter, and an open and generally circular bottom of smaller diameter;
   (b) means for supporting said bowl in a generally upright position such that said bowl is rotatable about its said longitudinal axis;
   (c) means for receiving the ejected said pellets proximate said die table surface of said pellet press and for discharging the received said pellets into said bowl at a location proximate said inner surface towards said top of said bowl with a pellet velocity having a horizontal component which is generally tangent to said inner surface of said bowl proximate said location;
   (d) means for rotating said bowl about said longitudinal axis such that said bowl proximate said location has a velocity generally equal, in magnitude and direction, to said horizontal component of said pellet velocity at said location; and
   (e) means for moving said sintering boat generally horizontally beneath and proximate said bottom of said bowl.

2. The system of claim 1, also for loading said pellets into a plurality of sintering boats, wherein said sintering boat moving means includes means for transporting a plurality of linearly aligned and adjacently disposed said sintering boats generally horizontally beneath, proximate, and along a direction of motion linearly across, said bottom of said bowl.

3. The system of claim 2, further comprising:
   (f) a flexible strap having a stationary end disposed outside said bowl at a vertical position above said bottom of said bowl and at a horizontal position upstream from said bottom of said bowl generally along said direction of motion of said sintering boats, and said strap having a free end disposed in one of said sintering boats when it is beneath said bottom of said bowl.

4. The system of claim 2, wherein said pellet receiving and discharging means includes a pellet chute having a pellet exit spaced apart from said inner surface of said bowl.

5. The system of claim 4, further comprising:
   (f) a flexible strap having a stationary end disposed outside said bowl at a vertical position above said bottom of said bowl and at a horizontal position upstream from said bottom of said bowl generally along said direction of motion of said sintering boats, and said strap having a free end disposed in one of said sintering boats when it is beneath said bottom of said bowl.

6. The system of claim 4, further comprising:
   (f) a stationary pellet sweep disposed inside said bowl, adjacent said inner surface of said bowl, and proximate said bottom of said bowl.

7. The system of claim 6, further comprising:
   (g) an arm having an upper end attached to said pellet chute and having a lower end attached to said pellet sweep, said arm, over the lower majority of its length, spaced apart from said inner surface of said bowl by a distance greater than the diameter of said pellets.

8. The system of claim 7, further comprising:
   (h) a flexible strap having a stationary end disposed outside said bowl at a vertical position above said bottom of said bowl and at a horizontal position upstream from said bottom of said bowl generally along said direction of motion of said sintering boats, and said strap having a free end disposed in one of said sintering boats when it is beneath said bottom of said bowl.

9. The system of claim 8, wherein said sweep also is disposed at a horizontal position upstream from the center of said bottom of said bowl generally along said direction of motion of said sintering boats.

10. The system of claim 9, further comprising:
(i) a flexible pellet-containment ring concentric with, attached to, and depending from said bottom of said bowl, said ring extending into one of said sintering boats when it is beneath said bottom of said bowl.

* * * * *